United States Patent [19]

Tamura et al.

[11] Patent Number: 5,346,574
[45] Date of Patent: Sep. 13, 1994

[54] PROCESS FOR MANUFACTURING A LAMINATE

[75] Inventors: Yasuo Tamura, Kanagawa; Ryoji Tanaka; Takahiko Gohma, both of Tokyo; Mitsumasa Horikawa, Aichi, all of Japan

[73] Assignee: Koyo Sangyo Co., Ltd., Tokyo, Japan

[21] Appl. No.: 907,784

[22] Filed: Jul. 1, 1992

Related U.S. Application Data

[62] Division of Ser. No. 743,584, Aug. 9, 1991, abandoned.

[30] Foreign Application Priority Data

Aug. 16, 1990 [JP] Japan .................. 2-216221

[51] Int. Cl.⁵ .................. B27J 1/00; B29C 65/02
[52] U.S. Cl. .................. 156/257; 144/333; 156/296; 264/137
[58] Field of Search ........... 156/196, 245, 257, 296, 156/271; 264/134, 136, 137; 144/333, 348, 352, 361, 362, 366, 350; 428/106, 537.1, 112, 114, 295, 375; 427/439, 440

[56] References Cited

U.S. PATENT DOCUMENTS

| | | | |
|---|---|---|---|
| 1,688,569 | 10/1928 | Wensel | 144/333 |
| 2,017,060 | 10/1935 | Hillerich | 144/352 |
| 3,464,877 | 9/1969 | Miller et al. | 156/296 |
| 4,232,067 | 11/1980 | Coleman | 156/296 |
| 4,695,345 | 9/1987 | Grace | 144/362 |
| 4,810,551 | 3/1989 | Chu | 428/106 |
| 4,818,321 | 4/1989 | Shimizu et al. | 156/254 |
| 5,026,593 | 6/1991 | O'Brien | 428/537.1 |

FOREIGN PATENT DOCUMENTS

| | | | |
|---|---|---|---|
| 164141 | 12/1980 | Japan | 144/333 |
| 280538 | 11/1989 | Japan | 156/296 |
| 1214246 | 12/1970 | United Kingdom | 428/375 |

*Primary Examiner*—Michael W. Ball
*Assistant Examiner*—Steven D. Maki
*Attorney, Agent, or Firm*—McAulay Fisher Nissen Goldberg & Kiel

[57] ABSTRACT

A laminated material comprises a plurality of straight portions of vegetable stalks, each having an epidermis mainly of lignocellulose and a porous core. These vegetable stalks straight portions are impregnated with a thermal hardener solution of high-molecularisable liquid compound, resinified liquid, or mixtures thereof, arranged in parallel to form a layer of a sheet-like material, piling these sheet-like materials and pressing them to make these layers come to contact closely in flat condition. It is possible to make the directions of vegetable stalks in the sheet-like material different from the neighboring layers in order to strengthen a bending strength and other physical strength of the piled multilayer laminated material, such as a pillar-like laminated material. Such pillar-like material is made by using a pair of pressing female mold and male mold, vegetable stalks being placed in the female mold and hot-pressed. After these vegetable stalks are laminated, the resin compound in the thermal hardener solution is set or harden.

5 Claims, 8 Drawing Sheets

PROCESS FOR MANUFACTURING A LAMINATE

This is a division of application Ser. No. 07/743,584, filed on Aug. 9, 1991 now abandoned.

BACKGROUND OF THE INVENTION

I. Field of the Invention

The present invention relates to a reinforced laminated materials of mainly vegetable fibers or lignocellulosic stalks of sorghum, corn, and sugar cane and the like and a method for the preparation of the laminated material. In particular, it concerns a laminated material used as building materials, furniture materials, heat insulating materials, sound absorbing materials, display materials, and materials for handicrafts.

II. Description of the Related Art

Nowadays, particleboard, fiberboard, and the like as well as lumber, plywood, veneer, and combined materials are used as wood-based building materials, furniture materials, display materials, sound absorbing materials, and various handicraft materials. Also, rigid materials or foamed materials of synthetic resin, such as polystyrene, polyethylene, polyurethane, phenol resin, melamine resin, and urea resin are used as display materials, sound absorbing materials, and heat insulating materials and the like.

Such materials used to these usages above depend on wood source and petroleum source. Lumber and plywood are wood itself and have high material strength sand dimensional stability. The portion of wood, which having such characteristics, is small, so that a usage percentage or yield of wood becomes disadvantageously low.

While, particleboard and fiberboard are made by combining wood chips and fibers adding synthetic resin bond to the mixture, heat-pressing it to form plates. These boards are made by chips or fibers of wood, so it is said that wood source are usefully used. However, cellulose fibers of wood are cut finely to made such boards, so that they have shortcomings of dynamic or mechanical strength and dimensional stability of the boards.

Wood materials, such as lumber, plywood, particleboard, and fiberboard and the like, which have been used very much as building materials and the like, are respectively made of mainly natural wood. With recent exhaustion of wood source, the supply of wood seems to have a limit. Consequently, it will be impossible to completely satisfy high demand of wood in future, and price of wood will be raised very much.

Foamed materials of synthetic resin, such as polystyrene, polyethylene, polyurethane, and phenol resin and the like are light and have good workability and excellent heat insulation, so that they are widely used as a display material and heat insulation material. These resins depend on petroleum source, which has a limit, and therefore it is afraid that the source will be exhausted in near future.

In order to deal with such situation of the world, the inventors have filed Patent Applications of laminated materials and method for manufacturing the same using straight portions of lignocellulosic stalks of sorghum, corn, sugar cane, respectively which are reproduced every year and difficult even to abandon or abolish (Japanese Patent Application Laid-open Sho 63-107505, Japanese Patent Application Laid-open Hei 1-280538).

According to the method described in the former specification of Patent Application Laid-open Sho 63-107505, vegetable stalks of sorghum, corn, sugar cane are cut along their fiber directions, if necessary, core portions, are removed, the cut open stalks are pressed, a plurality of pressed stalks are arranged in parallel in order to form sheets of stalks, a well-known adhesive is applied on plural sheets, adhered sheets are laminated, and they are pressformed.

According to the method described in the latter specification of Patent Application Laid-open Hei 1-280538, sorghum stalks are pressed flat to make flat stalks, a plurality of flat stalks are arranged to form flat stalks layer, well-known adhesives are spread on the plural flat stalk layers, finally the layers are laminated and pressformed.

Laminated materials made by these methods are wood materials having any specific gravity, thickness, size and having a performance of excellent mechanical strength.

However, according to the former method, although a very high mechanical strength and a dimensional stability of the plate material can be obtained, it necessitates a number of steps including cutting step of the vegetable stalks, a core-removing step and a pressing step so as to produce a piece of laminated material of a predetermined thickness and also necessitates much volume of raw material of vegetable stalks, resulting in a problem of high manufacturing cost of the products.

According to the latter method, although the manufacturing cost is low, the product of laminated material has a lower mechanical strength than that of the laminated material produce by the former. Furthermore, when the laminated material is soaked and it contains water, the laminated material is disadvantageously swelled and thicken.

SUMMARY OF THE INVENTION

An object of the present invention is to provide a laminated material having very high mechanical strength and dimensional stability, of a light weight and non-swelled with water, and having versatility.

Another object of the present invention is to provide a method for producing the laminated material at a low manufacturing cost.

In order to attain the objects above, as shown in FIGS. 1-4, the laminated material according to the present invention comprises a plurality of layers, respectively formed by a straight vegetable stalk portion 10, having a porous core 10b and an epidermis 10a of mainly lignocellulose, arranged in parallel to formed a respective layer 30. In the laminated material, respective layers are crossed to each other after respective stalk portions are pressed flat and come to contact to each other. All or part of the vegetable stalks contain resin compound thermally hardened.

According to the manufacturing method of the laminated material of the present invention, a plurality of straight vegetable stalk portions 10 each provided with porous cores 10b and epidermis 10a mainly of lignocellulose are treated by being impregnated with a heating hardener solution or a heat-hardenable solution 14 of high-molecularisable or polymerisable liquid compound, resinified liquid, or mixtures thereof, these vegetable stalk portions are arranged in parallel, and these arranged vegetable stalk portions are heat-pressed so as to thermally harden the heating hardener solution.

BRIEF DESCRIPTION OF THE DRAWINGS

The present invention will now be described more specifically with reference to the accompanying drawings wherein.

DESCRIPTION OF THE PREFERRED EMBODIMENT (a) Starting material

Figure 2:
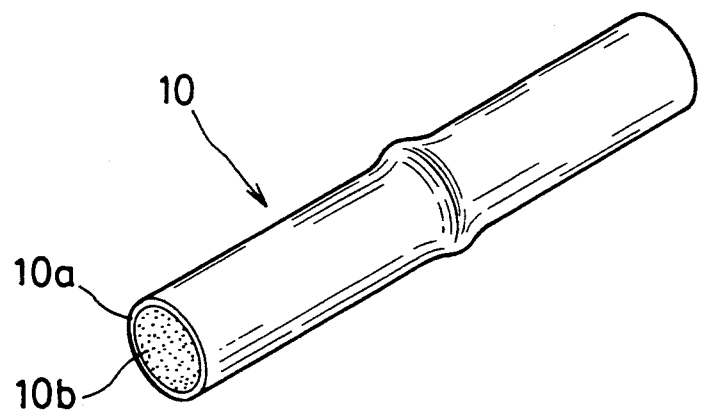
FIG. 2 is a perspective view of the vegetable stalk of starting material.

As shown in FIG. 2, the material used to manufacture the laminated material of the present invention is a vegetable stalk 10 having an epidermis 10a of mainly lignocellulose and a porous core 10b. Typical ones of the material are sorghum, corn, and sugar cane, as well as rush, rice plant, wheat.

According to the present invention, the straight portions of the vegetable stalks without leaves and skirt portions are used intact. The straight portions of the vegetable stalks aren't cut in chips, whereas the conventional bagasse board and straw board are made of vegetable stalks cut into chips and formed in plate-like. Thus, this laminated material having light weight and high bending strength can be manufactured with fewer steps than the conventional bagasse board.

Figure 3:
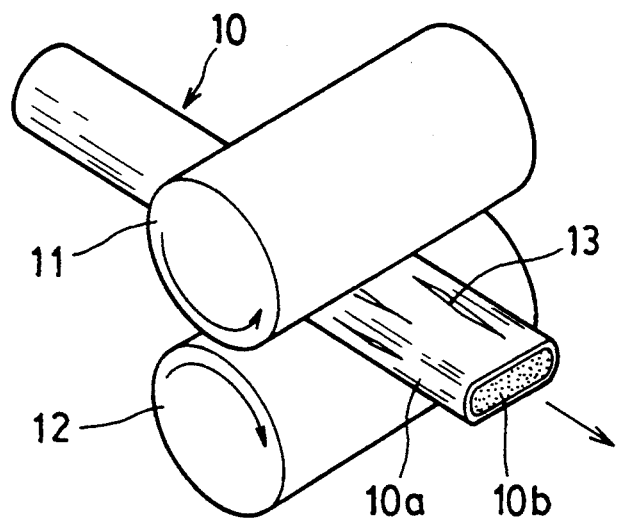
FIG. 3 is a perspective view of pressing rollers generating cracks in epidermis of vegetable stalks by pressing them.

It is preferable that, before a heating hardener solution is soaked into the vegetable stalks 10, these stalks 10 are pressed, not cut along their fiber direction, by a pair of press rollers 11 and 12 in order to form cracks 13 in the epidermis as shown in FIG. 3, or split along the fiber direction (not shown). Consequently, the heating or thermal hardener solution is easily soaked into the interior of the vegetable stalks 10 in a very short time of several minutes during the soaking step of the present invention.

The mechanical strength and dimensional stability of the laminated material of cracked vegetable stalks, including other physical properties of the material, are not inferior than that of non-cracked stalks.

(b) Thermal hardener solution

Figure 4:
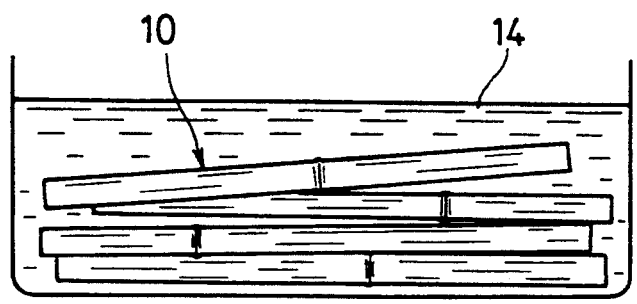
FIG. 4 is an explanation of soaking a thermal hardener solution into vegetable stalks.

As shown in FIG. 4, the thermal hardener solution 14 is soaked in the treated vegetable stalks 10. The thermal hardener solution is a liquid which can harden the vegetable stalks upon heating, and which includes a high-molecularisable liquid compound, a resinified liquid, or mixtures thereof.

Examples of the high-molecularisable liquid compound include:

(1) polymerisable liquid monomers, such as acrylic ester monomer, methyl methacrylate monomer, and styrene monomer, and the like, (2) high-molecularisable prepolymers obtained by the condensation, polymerisation or addition polymerisation of these liquid monomers, (3) liquid isocyanate compounds, such as tolylendiisocyanate, diphenylmethane diisocyanate, hexamethylene diisocyanate, isophorone diisocyanate, xylylene diisocyanate, and the like, or (4) high-molecularisable liquid compounds made by the polymerisation, condensation, or addition condensation of frufural, furfuryl alcohol, or liquefied liquid of lignocellulose.

Here, liquefied liquid of lignocellulose means a solution obtained by liquefying lignocellulose by adding phenols, polyols to the lignocellulose. The liquefied liquid of lignocellulose is prepared by melting leaves or skirt portions to be thrown away of vegetable stalks, for example, sorghum stalks or non-usable curved portion and end portions of such vegetable stalks under high temperature of 150°–300° C. high pressure of 1–100 atmosphere, and in the presence of phenol. It is possible to conduct said melting under atmospheric pressure at a temperature of 150°–200° C. by using an acid catalyst, such as sulfuric acid, hydrochloric acid, phenolsulfonic acid, or paraffin sulfonic acid.

In addition, the resinified liquid above includes liquid polymers, such as unsaturated polyester resin, epoxy resin, phenol resin, melamine resin, and urea resin and prepolymers thereof. It is also possible to use the resinified liquid prepared by dissolving thermoplastic resins, such as polyvinyl chloride, polyvinyl acetate, acrylic resin, polystyrene, polyvinyl alcohol, nylon, and polyamide resin and the like in a solvent, or a resinified liquid of lignocellulose. Here, the resinified liquid of lignocellulose above means one prepared by resinifying the liquefied liquid of lignocellulose by using aldehyde compounds or isocyanate compounds, then dissolving the resinified liquid in water or solvent.

(c) Soaking of thermal hardener solution

The thermal hardener solution of the present invention soaks into vegetable stalks in a rate of 5–200 wt. of all dry weight of the stalks. It soaks sufficiently into vegetable stalks under room temperature and atmospheric pressure. Soaking may be carried out by specifically heating the thermal hardener solution, or under increase or decrease in pressure.

When a soaked volume of the thermal hardener solution is over 50 wt. %, the hardener solution will ooze through the laminated material, while a plurality of sheet-like materials are laminated, obtaining adhere action, reducing considerably the usage volume of the original adhesive agent. When the thermal hardener solution doesn't contain any high-molecular component, it is necessary to make the soak volume of thermal hardener solution more than 50 wt. %, or use an adhesive agent in addition to the hardener solution.

When the soak volume of thermal hardener solution is 5 wt. % or less, it is difficult to obtain sufficient reinforcement effect of the laminated material, which effect is one of the objects of the present invention, and in particular a good dimensional stability of the material. In addition, when the soak volume exceeds 200 wt. %, soaking is made difficult, so that even a compulsory soaking, for example, pressurized injection of a thermal or heating hardener solution cannot improve the strength and the dimensional stability of the laminated material.

Figure 5:
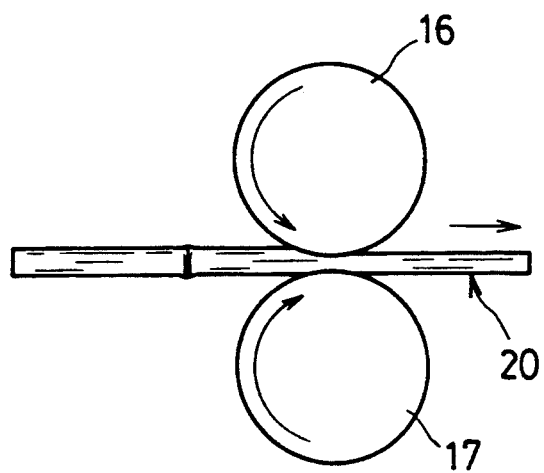
FIG. 5 is a side elevation of squeezing rollers for removing surplus thermal hardener solution from the impregnated vegetable stalks.

As shown in FIG. 5, it is preferable that, in order to remove a surplus thermal hardener solution and obtain a vegetable stalk 20 containing desired volume of the solution, the vegetable stalk 10 containing the surplus solution is squeezed through a pair of squeezing rollers 16 and 17. After drying at room temperature to 200° C., these squeezed vegetable stalks 20 are arranged in parallel in order to form a plate-like or pillar-like laminated material.

(d) Formation of plate-like laminated material

Figure 1:
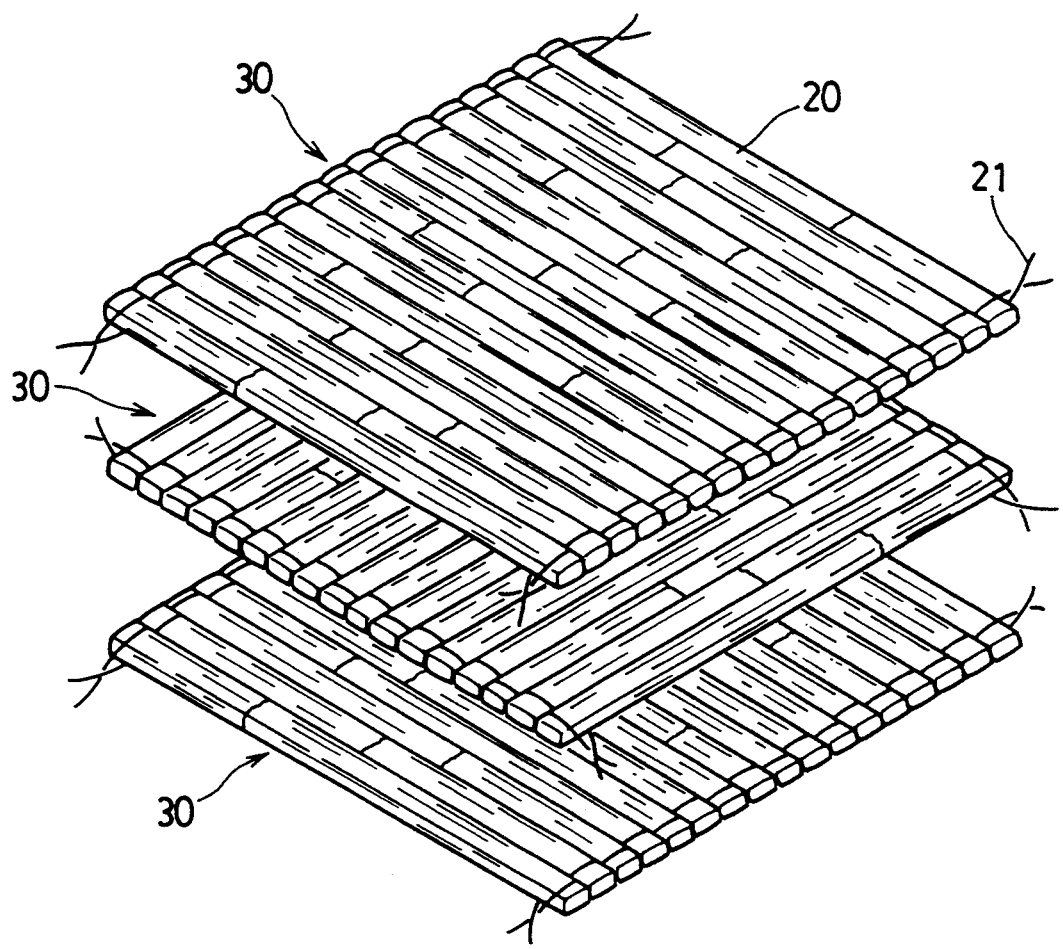
FIG. 1 is a perspective view showing a plurality of sheet-like materials arranged so as to cross the vegetable stalks constructing the material to each other or alternately.

As shown in FIG. 1, vegetable stalks 20 are arranged in parallel to obtain a sheet-like material 30. A plurality of such sheet-like materials are piled. When the plate-like laminated material is formed, end portions or edges of all vegetable stalks are bound by a thread 21 or temporarily held or secured in place by a sticking tape and the similar holding means, or all vegetable stalks are bound by applying an adhesive agent to the end portions or edges in a shape of thread or band.

Figure 6:
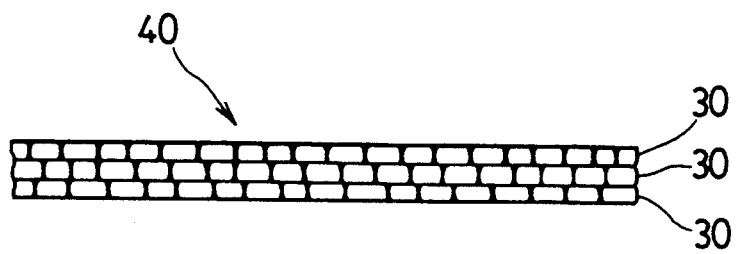
FIG. 6 is a side elevation of a laminated product consisting of a plurality of sheet-like materials, which materials have vegetable stalks arranged along the same direction.
Figure 8:
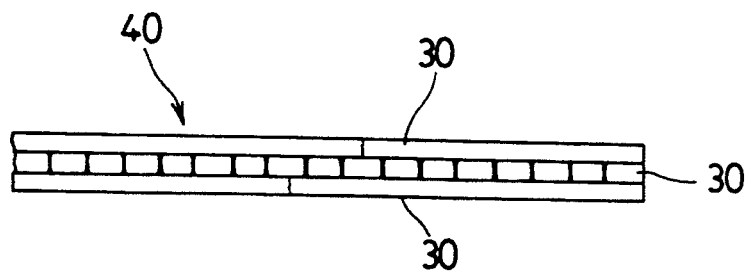
FIG. 8 is a side elevation of the laminated product of the sheet-like materials piled as shown in FIG. 1 and temporarily pressed.

The piling method of sheet-like materials is determined depending upon the usage purpose of the plate-like laminated materials. When it is necessary to give uniform bending strength the plate-like laminated material along all directions and prevent it from curving or bending, respective sheet-like materials 30 are piled so as to cross the directions of the respective vegetable stalks 20 constructing the sheet-like material, thereby forming a laminated product 40 as shown in FIGS. 1 and 8. When it is necessary to obtain the plate-like laminated material having a strong bending strength in a particular direction, plural sheet-like materials 30 are piled so that all the vegetable stalks 20 can be oriented in the same direction, thereby forming a laminated product 40 as shown in FIG. 6.

Figure 7:
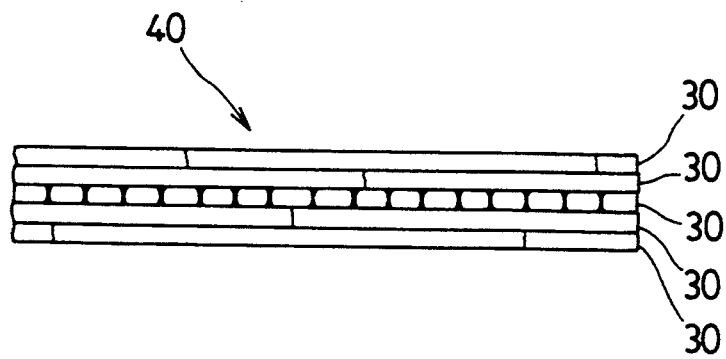
FIG. 7 is a side elevation similar to FIG. 6 except that the laminated product has some sheet-like materials respectively having vegetable stalks directed another direction.

It is possible as shown in FIG. 7 to arrange a specific set of vegetable stalks constructing the sheet-like material 30 so as to cross other sets of vegetable stalks of other sheet-like materials 30, thereby forming another laminated product 40. It is preferable to pile a plurality of the sheet-like materials' so as to cross alternately their vegetable stalks in order to prevent a bending strength of the plate-like laminated material from increasing along the particular direction.

Soaking a thermal hardener solution in all vegetable stalks of the plate-like laminated material is preferable form the standpoint of the physical strength and dimensional stability of the laminated material. It is possible, however, to soak the thermal hardener solution into only part of the vegetable stalks constructing the plate-like laminated material in order to reduce its production cost. The thermal hardener solution may not soak into all vegetable stalks constructing, for example, some sheet-like material, or it may not soak into a part of the vegetable stalks constructing the sheet-like material.

When a small volume of the thermal hardener solution is soaked in the vegetable stalks or a particular kind of the solution is soaked, an adhesive agent or liquid is applied or deposited on the surface of the sheet-like material.

The adhesive agent used in the case above is well-known one, for example, urea resin, melamine-urea condensation resin, phenol-melamin resin, phenol resin, phenolresorcinol resin, resorcinol resin, and isocyanates adhesives containing aqueous high-molecular isocyanate adhesive, and tannin resin. When the resinified liquid of lignocellulose described above is used as the adhesive agent of the present invention, an adhesive performance between the sheet-like materials is preferably raised because the resinified liquid has a high affinity to the vegetable stalks and a usage ratio of the stalks rises, resulting in economical and effective usage of the vegetable stalks. These adhesive agents may be used alone or in combination.

The usage volume of the adhesive agent is 1–50 wt. % based on all dry weight of the sheet-like material. When the usage volume is 1 wt. % or less, the structural strength of the laminated material decreases considerably. When it is 50 wt % or more, the cost of the laminated material is raised exceedingly comparing to the performance of the material.

Figure 9:
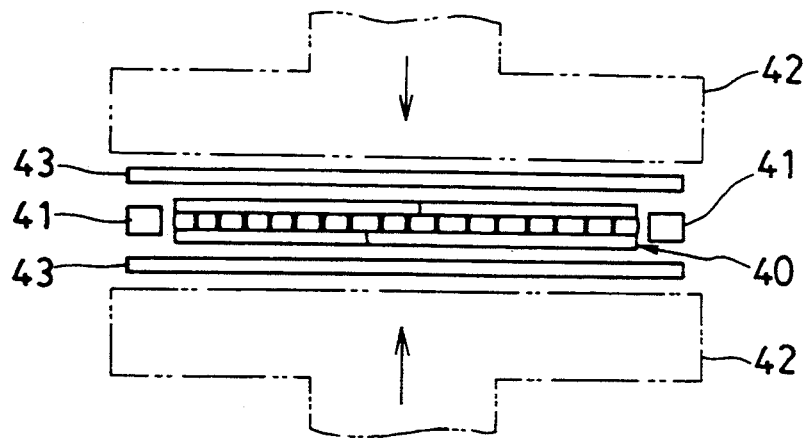
FIG. 9 shows how to hot-press the laminated product shown in FIG. 8.
Figure 10:
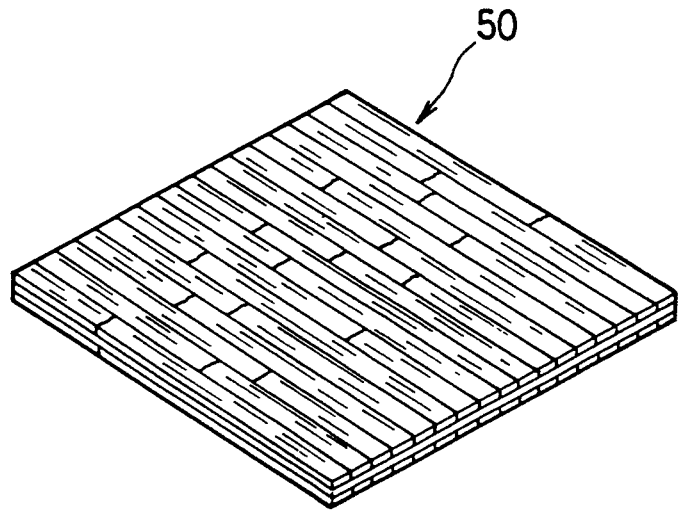
FIG. 10 is a perspective view of the plate-like laminated material after it is thermally press-formed.

As shown in FIGS. 8–10, the piled sheet-like materials 30 are, if necessary, temporarily pressed obtaining a laminated product 40, the product 40 is sandwiched between a pair of metal plates 43, and a hot press 42 presses the product by a pressure of 2–30 kg/cm$^2$ at a temperature in the range of from 50°–250° C.

Placing spacers 41 by the product 40 as shown in FIG. 9 enables to determine the thickness of the laminated product 40, thereby forming a plate-like laminated material 50 with the desired thickness. In order to raise a smoothness of the material 50 or to obtain its precise thickness, the surface of the material 50 is machined, if necessary, by a scraper, planer, sander, and the like. It is possible to laminate a single plate of MDF (Medium Density Fiber Board), particleboard, metal plate, film, and the like.

(e) Production of pillar-like laminated material

According to the first manufacturing method of the pillar-like laminated material, a plurality of straight vegetable stalk portions are arranged in parallel mutually and bundled. The bundled vegetable stalks are thermally pressed to form in a shape of pillar. It is called a batch type process.

Figure 11:
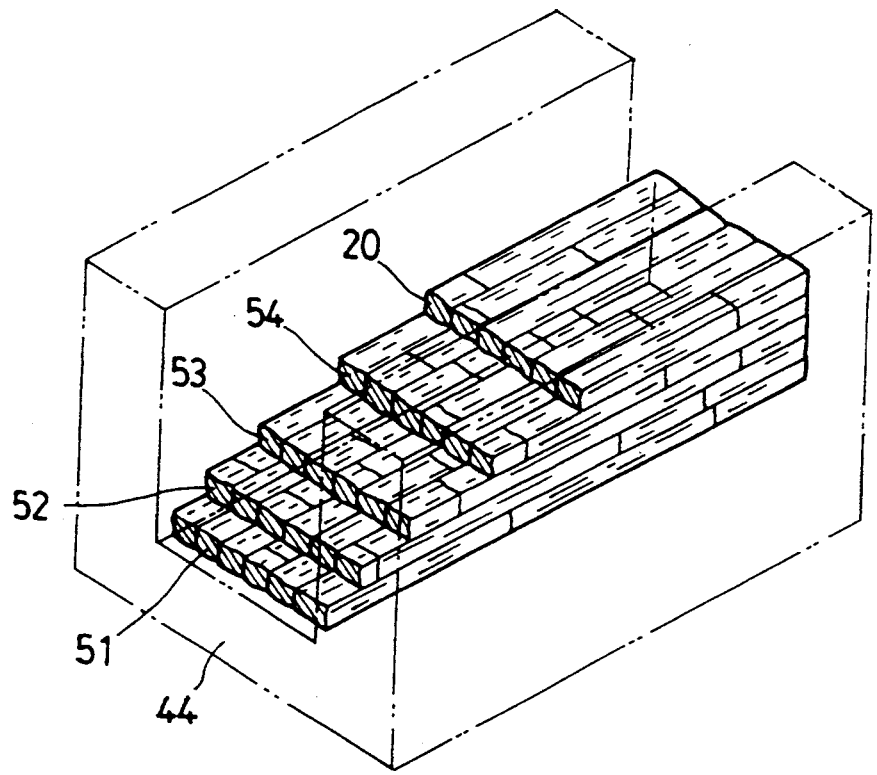
FIG. 11 is a perspective view of a main portion of a female mold and vegetable stalks placed in the mold in order to manufacture a pillar-like laminated material.

As shown in FIG. 11, first a plurality of vegetable stalks 20 are arranged directing in the same direction and they are placed flatly on an inner bottom of a trough-shaped female mold 44 to form a first layer 51 of vegetable stalks. In case that the length of the female mold 44 is longer than that of the vegetable stalk 20, the vegetable stalks are arranged continuously in the longitudinal direction, and then are cut in order so as to put in the mold 44. Next, a plurality of other vegetable stalks 20 are piled on the first layer 51 arranged in the female mold 44 forming a second layer 52. According to the laying method above of the vegetable stalks 20, a third layer 53 and a fourth layer 54 are formed. It is necessary to shift seams of the upper layer of vegetable stalks 20 from seams of the lower layer of vegetable stalks 20, when adding to other vegetable stalks in the longitudinal direction, in order to strengthen the bending strength of the pillar-like laminated material.

Figure 12:
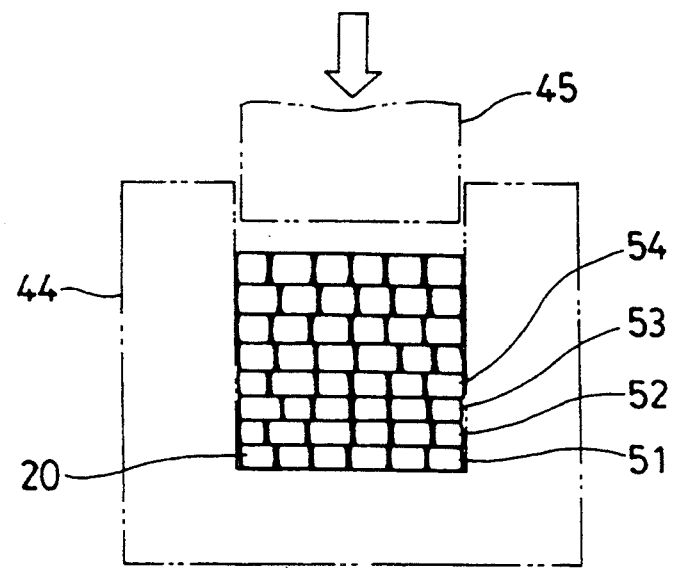
FIG. 12 is a side section showing the first method for producing the pillar-like laminated material by inserting a male mold into the female mold.
Figure 13:
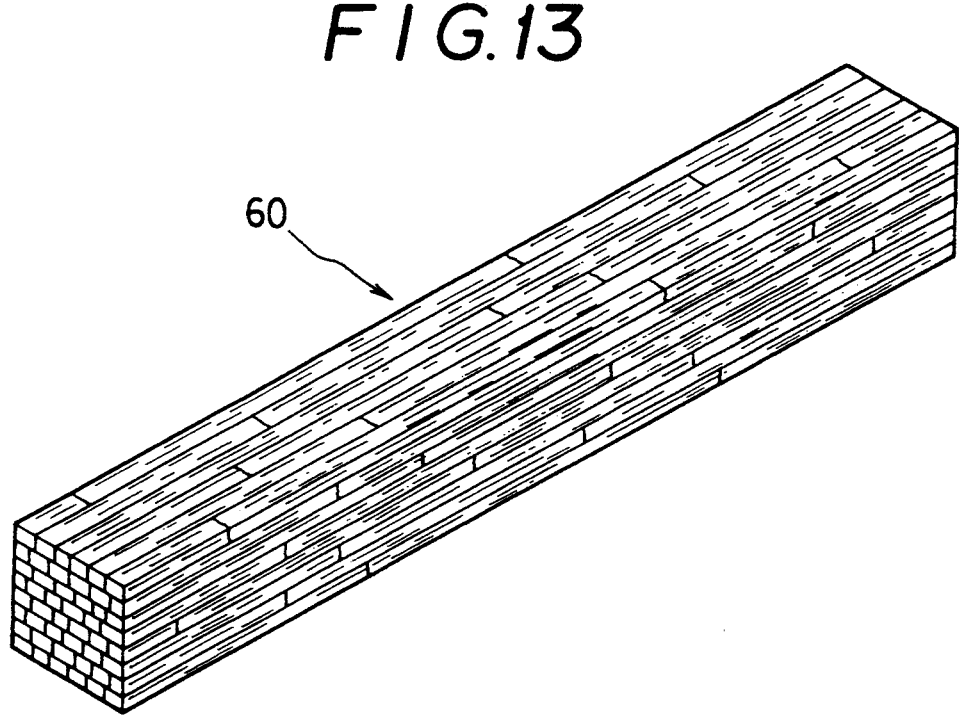
FIG. 13 is a perspective view of the pillar-like laminated material after it is thermally press-formed as shown in FIG. 12.

As shown in FIGS. 12 and 13, after several layers of vegetable stalks 20 are piled, a male mold 45 is placed in the female mold 44 and the former is pressed to form a pack of vegetable stalks 20 of a pillar-like laminated material 60. When a volume of the thermal hardener solution soaked in the vegetable stalks is small or a particular kind of the hardener solution is used, an adhesive agent is applied on the layer surfaces of vegetable stalks, and then the layers are piled in the same manner as manufacturing the plate-like laminated material.

Figure 14:
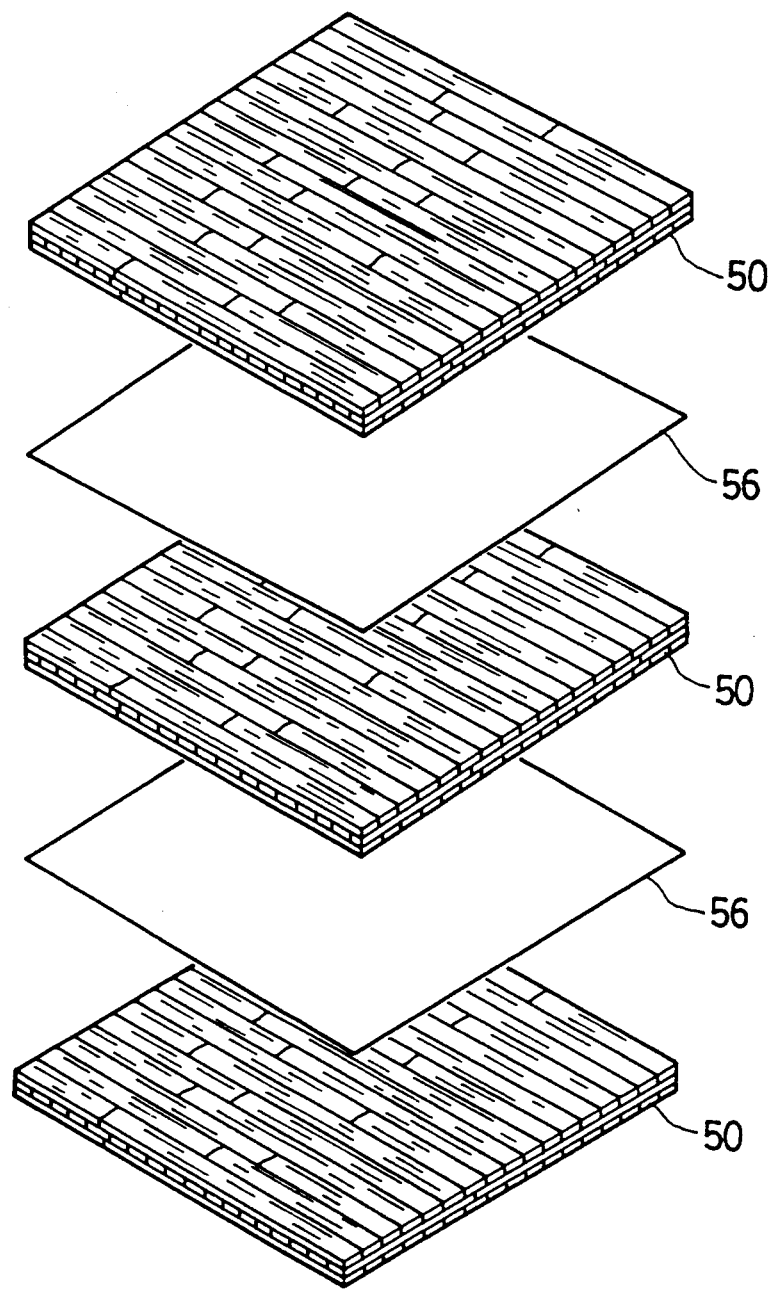
FIG. 14 is a perspective view of the second method for forming another pillar-like laminated material by piling several plate-like laminated materials.
Figure 15:
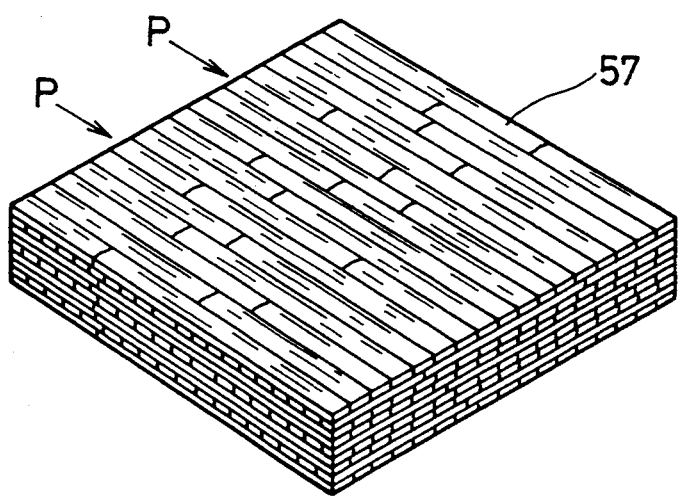
FIG. 15 is a perspective view of a plurality of plate-like laminated materials adhered to each other.
Figure 16:
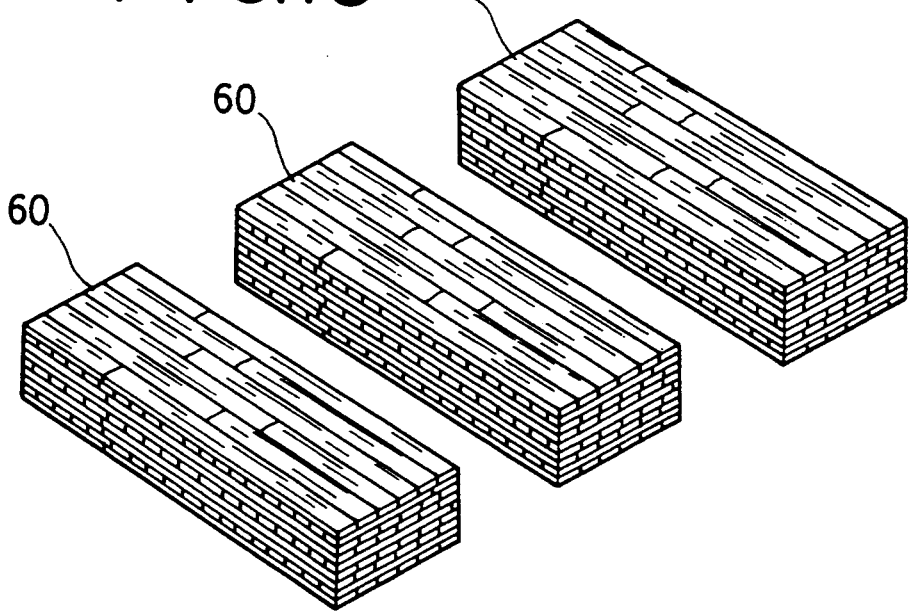
FIG. 16 is a perspective view of the pillar-like laminated material cut out from the multi-layer laminated product.

According to the second method for producing the pillar-like laminated material of vegetable stalks, several plate-like laminated materials 50 are adhered as shown in FIGS. 14-16 to each other and the pack of the adhered plate-like laminated materials 50 is cut along the arrangement direction of the vegetable stalks. In this method, a plurality of plate-like laminated materials 50 are heat-pressed after an adhesive agent is applied on both surfaces of each material. It is possible to insert thin sheets 56, such as plastic material ones, single plates, veneers on both surfaces of which an adhesive agent has been applied between these laminated materials 50 before heat-pressing them. Such process is preferable since application of an adhesive agent is made easy and reliable. The resulting multi-layer laminated product 57 is cut through lines shown by arrows "P" shown in FIG. 15, thereby obtaining pillar-like laminated materials 60. Such process can only provide square pillars, but it is one easier than the first method producing pillar-like materials through a usage of male and female molds. The square pillar-like laminated material 60 is excellent in its dimensional stability and bending strength.

Figure 17:
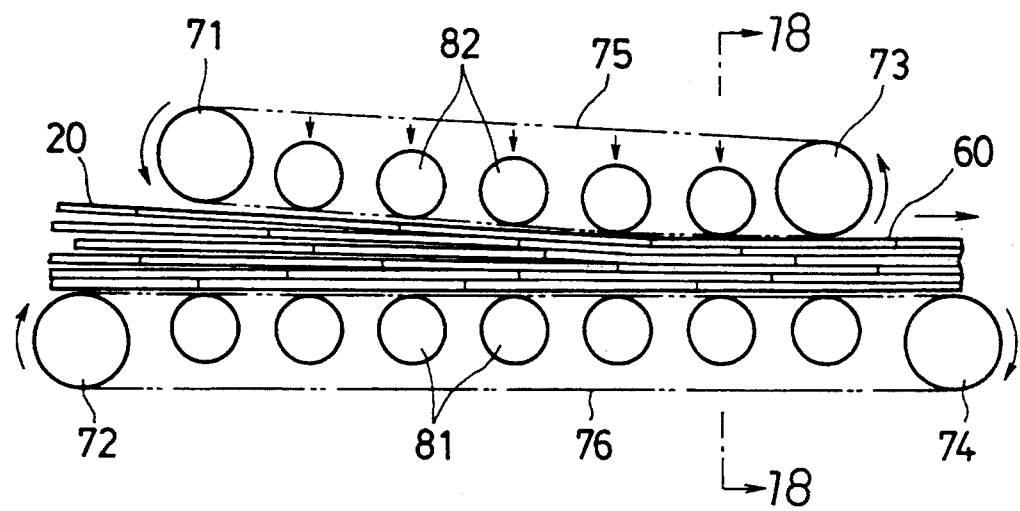
FIG. 17 shows a section taken along line 17—17 of the device for manufacturing the pillar-like laminated material shown in FIG. 18 according to the third method.
Figure 18:
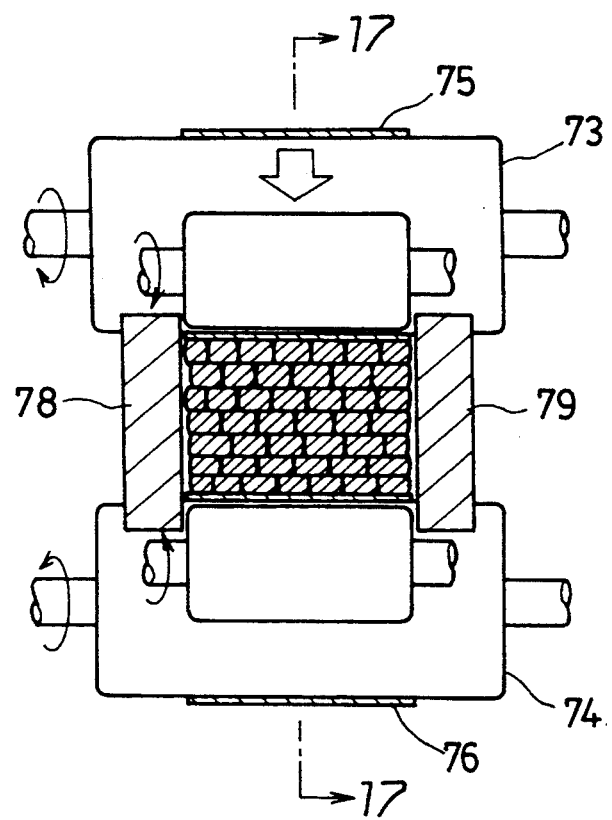
FIG. 18 is a section taken along line 18—18 of FIG. 17.

The third method of producing continuously pillar-like laminated materials is shown in FIGS. 17 and 18. According to this method, the producing apparatus has a pair of driven rollers 71 and 72, and another pair of driving rollers 73 and 74. Around these pairs of rollers, respectively, endless steel belts 75 and 76 are wound. There is a space between the lower portion of the endless steel belt 75 and the upper portion of other belt 76. The space distance formed at a side of rollers 73 and 74 corresponds to the thickness of the pillar-like material finally laminated, and other space distance formed at another side of rollers 71 and 72 is made larger more than that of the space at the side of rollers 73 and 74. A pair of side walls 78 and 79 are placed at both the sides of the endless steel belts 75 and 76. A plurality of heating idle rollers 81 are placed between the lower rollers 72 and 74 so as to rotate at fixed positions. Other plurality of heating pressing rollers 82 are placed between the upper rollers 71 and 73 so as to up and down through their vertically movable shafts. Width of the belts 75 and 76 of the rollers 81 and 82 is substantially equal to one of the pillar-like material finally obtained.

In this method, a plurality of straight portions of vegetable stalks 20 are bundled and continuously supplied on the upper portion of the rotating lower endless belt 76, being proceeded to the space between rollers 71 and 72, or both the endless belts 75 and 76. Proceeding between the sets of upper rollers 82 and lower rollers 81, the vegetable stalks 20 are press-formed with heat becoming a pillar-like laminated material 60.

When a volume of the thermal hardener solution soaked into vegetable stalks is small, or the particular kind of the thermal hardener solution is used, an adhesive agent is applied on the vegetable stalks in the same manner as the first method above, and then they are fed on the belt 76. The third method above enables to produce without difficulty a very long pillar-like laminated material in mass production manner.

Meanwhile, when various kinds of shape of the thermal pressing molds are suitably selected, it is possible to manufacture any laminated materials of any shape other than the plate-like or pillar-like laminated material.

Next, the operation and effect of the present invention will be explained.

When a thermal hardener solution is to be soaked into the vegetable stalks, the solution permeates easily not only into epidermis of the vegetable stalk but also porous core thereof uniformly. In particular, when liquefied liquid of lignocellulose or resinified liquid thereof is used as a thermal hardener solution, parts of low molecular weight and of high molecular weight are simultaneously impregnated into the core of the vegetable stalks, since these liquefied liquid of lignocellulose and resinified liquid above has a various kinds or wide range of molecular weights formed when they are decomposed, such as hydrolysis of lignocellulose and the like. In addition, a part of low molecular weight is soaked into the epidermis in depth improving epidermis reinforcing effect, and high molecular weight part forms a resin layer in an upper layer of the epidermis reinforcing the epidermis, as well as improving adhesion function.

When liquefied liquid of lignocellulose or its resinified liquid is used, the usage volume of an adhesive agent to be employed in the laminating process of vegetable stalks can be reduced or made zero.

When the plurality of vegetable stalks arrange in order are press-formed, the adhesive agent is dried, and thermal hardener solution hardens and changes to resin compound, resulting in a production of a reinforced laminated material.

As described above, according to the present invention, vegetable stalks which are abundantly existed as a natural resources can be effectively used, manufacturing economical laminated materials.

A density of the laminated material is in a range of 0.3–0.7 g/cm$^3$, being very light weight comparing to particleboards, fiberboards and the like presently on the market. While, physical strength, typically bending strength, and dimensional stability of this laminated material are apparently higher than the level of the conventional laminated material produced by arranging sorghum stalks intact and pressing, as well as the level of the particleboards and fiberboards, Physical strength of the laminated material depends on a volume of thermal hardener solution soaked in the vegetable stalks and a density of the resulting laminated material, so it is easy to obtain an arbitrary laminated material having any physical strength by suitably selecting such impregnation volume and density.

Making the thermal hardener solution impregnated in vegetable stalks into a resinified compound can prevent the laminated material from being swelled when it is sunk in water, keeping smoothness of the surfaces of the laminated material and a high dimensional stability.

In addition, using resinified liquid of lignocellulose as an adhesive agent enables to effectively use the parts of vegetable stalks to be abandoned, and to reduce the usage volume of expensive adhesive agent, producing the laminated material of a lower cost.

Similar to the conventional plywood, particleboard, fiberboard, the thus obtained laminated material can be used widely as construction and building materials, such as under-floor material, under-roof material, underwall material, concrete casting frames, skin plate of furniture panels, panel frame, table board, and the like.

Further, by controlling the density of the laminated material, it is possible to make the material to have a suitable thermal insulation or sound-absorbent and use as an insulator or sound-absorber, or to widely use as various displaying materials. In particular, by selecting the shape of the mold to be used in the thermal-press shaping process of the laminated material, it is possible to obtain ones having various shapes, such as curved plates, waved plates, square columns, round columns and the like, respectively used as construction material or members of furniture.

Preferred examples of the present invention will be explained together with a comparative example.

EXAMPLE 1

As shown in FIGS. 2–5, several sorghum straight portions 10 of about 30 cm intact are prepared by cutting operations, and they are pressed through a pair of pinch rollers 11 and 12 having or leaving a gap of about 60% of the diameter of the stalk between them in order to form fine cracks 13 in epidermis 10a of the stalks 10.

These sorghum stalks 10 with fine cracks were soaked in an aqueous solution 14 of 5% of phenol resin (made by Ohshika Shinko Co., Ltd, TD-62) for reinforcing wood for five minutes. The phenol resin solution was soaked into the core 10b through epidermis 10a as well as fine cracks 13. The sorghum stalks 10 thus treated were pressed through a pair of squeezing rollers 16 and 17 leaving a gap of about 60% of the diameter of the stalk 10 so as to remove surplus phenol resin solution, were dried for three days at a room temperature. Consequently, sorghum stalks 20 soaked with resin liquid were obtained.

As shown in FIGS. 1 and 8, seventeen straight portions 20 of sorghum stalk were arranged in parallel and closely, and end portions of the sorghum stalks were bound with a thread 21 to thereby form three sheet-like materials 30, each having a width of about 30 cm.

Next, 10 g of water dispersed liquid of 50% of isocyanates resin (made by Mitsui Toatsu Co., Ltd, UR-4000) was spray-coated on each single side face of these sheet-like materials 30. Each sheet-like material 30 was piled on each other so as to cross mutually the straight portions 20 of sorghum stalk, thereby obtaining a laminated product 40 consisting of three layers.

Furthermore, as shown in FIG. 9, the laminated product 40 was introduced to a hot press 42 provided with a spacer 41 having a thickness of 12 mm and kept at a temperature of 150° C. By sandwiching the laminated product 40 with a pair of metal plates 43, it is hot-pressed for 10 minutes under a pressure of about 4 kg/cm$^2$ and then a plate-like laminated material 50 was obtained.

EXAMPLE 2

A plate like laminated material was obtained in the same manner as Example 1, except that an aqueous solution of 10% of phenol resin was used as a thermal hardener solution in place of the solution of 5% of phenol resin in Example 1.

COMPARATIVE EXAMPLE 1

A plate-like laminated material was obtained in the same manner as Example 1, except that the phenol resin solution of Example 1 was not used.

EXAMPLE 3

Prior to the manufacturing of laminated materials, a resinified liquid of sorghum stalks which is used as a thermal hardener solution was prepared. That is, 700 g of chips of end portions of sorghum stalks and 300 g of phenol were put into an autoclave of 1 liter volume, then they were stirred slowly and heated up to 250° C. When the pressure in the autoclave rises to 45 atmospheric pressure, this condition was kept for about three hours and the chips of sorghum stalks were dissolved in phenol.

Next, 800 g of the liquefied liquid of sorghum stalks and 1000 g of 37% formalin were introduced into a flask with three mouths of 1 liter volume. 160 g of 40% caustic soda solution was added to these liquefied liquid and formalin while being stirred, and then the mixture was heated at a temperature of 80° C. for 30 minutes. After the reaction, the resultant product was quickly cooled and water was added to it so as to prepare a thermal hardener solution diluted to 10% concentration.

Portions of sorghum stalks cut to length of about 30 cm were treated in the same manner as Example 1 so as to have cracks thereon, the stalk portions were soaked in the thermal hardener solution for five minutes, soaked stalks were passed through the squeezing rollers described in Example 1 in order to remove excessive thermal hardener solution, then squeezed stalks were dried for three days at a room temperature.

The sorghum stalks in which the thermal hardener solution was soaked were used to form three sheet-like materials, each having a width of about 30 cm in the same manner as Example 1. 3.5 g of water dispersed liquid of 50% of isocyanates resin identical with that of Example 1 was spray-coated on each single side face of these sheet-like materials. The steps identical with that of Example 1 were carried out to manufacture a plate-like laminated material.

EXAMPLE 4

Prior to the manufacturing of laminated materials, an adhesive agent was prepared. That is, 500 g of phenol and 12 g of a concentrated sulfuric acid were added to 500 g of bagasse and then the mixture were heated for about 2 hours at a temperature of 150° C. 200 g of bagasse phenol solution and 540 g of 37% formalin were introduced into a flask with three mouths of 1 liter volume, and then 100 g of 40% caustic soda solution was added to the solution and formalin while being stirred. The mixture was heated at a temperature of 80° to 90° C. for 50 minutes to prepare an adhesive agent.

Straight portions of corn stalks cut in length of about 30 cm intact were soaked in a methyl methacrylate liquid including 0.5% of benzoyl peroxide and 1.0% of dioctyl phthalate for ten minutes. In the same manner as Example 1 excessive monomer liquid was removed and dried at a room temperature.

Seventeen corn stalks portions were arranged in parallel and closely, and end portions of the stalks were bound in the same manner as Example 1 to thereby form three sheet-like materials, each having a width of about 30 cm.

After 10 g of the above adhesive agent was spray-coated on each single face of these sheet-like materials, each sheet-like material was piled on each other so as to cross the corn stalks mutually and alternately, thereby obtaining a laminated product consisting of three layers.

Furthermore, in the same manner as Example 1 the laminated product was introduced into a hot press provided with a spacer having a thickness of 12 mm and kept at a temperature of 150° C. The laminated product was hot-pressed for 10 minutes under a pressure of about 4 kg/cm$^2$ and then a plate-like laminated material was obtained.

Four plate-like laminated materials, respectively manufactured according to Example 1, Example 2, Comparative example 1, and Example 3 were placed at a room temperature for seven days, and the plate-like laminated material manufactured according to Example 4 was left at a room temperature for ten days. These five plate-like laminated materials were tested on their cold bending strength, Young's modulus of bending, swelling index in thickness substantially according to the test procedure for particleboards regulated in JIS A 5908. The test results are shown in Table 1.

small in comparison with that of Comparative example 1.

As apparent from the above-statement, the plate-like laminated materials according to Examples 1-4 have excellent industrial features.

What is claimed is:

1. A method for manufacturing a laminate comprising:
   a first step of compressing a plurality of vegetable stalks, each having an epidermis and a porous core to form cracks in the epidermis;
   a second step of impregnating the vegetable stalks with a thermal hardener solution by soaking the thermal hardener solution through the cracks and into the core;
   a third step of drying the impregnated vegetable stalks;
   a fourth step of placing the dried vegetable stalks side-by-side and in contact with one another to form a sheet;
   a fifth step of applying an adhesive agent to the sheet;
   a sixth step of placing an additional sheet on said formed sheet to form a plurality of layers; and
   a seventh step of applying pressure to the plurality of layers and subjecting the plurality of layers to a heat treatment to harden said thermal hardener solution and form a laminate.

2. The method of claim 1 wherein the thermal hardener solution is a resinified liquid of lignocellulose.

3. The method of claim 1 wherein in the sixth step, the plurality of layers are formed in a female mold and in the seventh step, a pillar shaped laminate is formed.

4. The method of claim 1 wherein more than one laminate is formed and further comprising after the seventh step, applying an adhesive agent to each surface of a thin sheet, and interposing the thin sheet between the laminates, heating and applying pressure to the laminates and the thin sheet to form a multi-layer laminate, and cutting the multi-layer laminate to form a pillar shaped laminate.

5. The method of claim 1 wherein the stalks are selected from the group consisting of sorghum, sugar cane, corn, rush, rice plant, and wheat.

TABLE 1

|  | thickness (mm) | density (g/cm$^3$) | resin soaked ratio (%) | mean bending strength (kg/cm$^2$) | Young's bending modulus (kg/cm) | Coefficient of water absorption (%) | thickness swelling ratio (%) |
| --- | --- | --- | --- | --- | --- | --- | --- |
| Example 1 | 12.00 | 0.34 | 7.3 | 188 | 3.85 × 10$^4$ | 117 | 11.0 |
| Example 2 | 12.00 | 0.37 | 12.9 | 206 | 4.62 × 10$^4$ | 95 | 7.0 |
| Comparative example 1 | 12.10 | 0.31 | 0 | 152 | 2.88 × 10$^4$ | 184 | 36.0 |
| Example 3 | 12.00 | 0.35 | 10.4 | 227 | 5.03 × 10$^4$ | 87 | 5.5 |
| Example 4 | 12.03 | 0.39 | 15.2 | 286 | 6.21 × 10$^4$ | 36 | 3.4 |

Table 1 indicates that, as for the reinforced plate-like laminated material made of sorghum stalks, the bending strength of the Examples are about 1.2 to 1.5 times of that of Comparative example 1, Young's modulus are about 1.3 to 1.7 times of Comparative example 1. It also indicates that the water absorption coefficient and thickness swelling ratio of respective Examples are very

* * * * *